United States Patent
Kronander et al.

(10) Patent No.: US 11,963,227 B2
(45) Date of Patent: Apr. 16, 2024

(54) ENHANCED TIMING ADVANCED FILTERING

(71) Applicant: Telefonaktiebolaget LM Ericsson (publ), Stockholm (SE)

(72) Inventors: Jonas Kronander, Knivsta (SE); Magnus Stattin, Upplands Väsby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 461 days.

(21) Appl. No.: 17/276,229

(22) PCT Filed: Sep. 6, 2019

(86) PCT No.: PCT/SE2019/050840
§ 371 (c)(1),
(2) Date: Mar. 15, 2021

(87) PCT Pub. No.: WO2020/060467
PCT Pub. Date: Mar. 26, 2020

(65) Prior Publication Data
US 2022/0046711 A1 Feb. 10, 2022

Related U.S. Application Data

(60) Provisional application No. 62/734,811, filed on Sep. 21, 2018.

(51) Int. Cl.
*H04W 74/08* (2009.01)
*H04W 74/0833* (2024.01)

(52) U.S. Cl.
CPC ................ *H04W 74/0833* (2013.01)

(58) Field of Classification Search
CPC ............. H04W 74/0833; H04W 56/0045
See application file for complete search history.

(56) References Cited

U.S. PATENT DOCUMENTS

2009/0175292 A1* 7/2009 Noh .................... H04W 74/006
370/462
2016/0143059 A1 5/2016 Jha et al.
(Continued)

FOREIGN PATENT DOCUMENTS

WO 2017082950 A1 5/2017

OTHER PUBLICATIONS

International Search Report and Written Opinion dated Dec. 3, 2019 for International Application No. PCT/SE2019/050840 filed on Sep. 6, 2019, consisting of 11-pages.
(Continued)

*Primary Examiner* — Jamal Javaid
*Assistant Examiner* — Ryan C Kavleski
(74) *Attorney, Agent, or Firm* — Christopher & Weisberg, P.A.

(57) ABSTRACT

A method implemented in a User Equipment, UE, for a cellular communication system includes transmitting a Random Access (RA) preamble and receiving a Random Access Response (RAR) from a base station (BS) containing a timing advance value, $T_A$, indicative of a radio signal propagation delay between the UE and the BS and information indicative of an added time delay, $T_F$, between reception of the RA preamble by the BS and transmission of the RAR by the BS.

10 Claims, 7 Drawing Sheets

(56) References Cited

U.S. PATENT DOCUMENTS

2019/0342845 A1* 11/2019 Laselva .............. H04B 7/18504
2020/0177315 A1*  6/2020 Lou .................... H04L 43/0864

OTHER PUBLICATIONS

3GPP TSG RAN WG1 Meeting #91 R1-1720949; Title: Multiple Preamble Transmissions for contention-free random access; Agenda Item: 7.1.6; Source: Ericsson; Document for: Discussion, decision; Date and Location: 27—Dec. 1, 2017, Reno, Nevada, US, consisting of 5-pages.

Mohammad Istiak Hossain et al.; DERA: Augmented Random Access for Cellular Networks with Dense H2H-MTC Mixed Traffic; School of Information and Communication Technology; KTH Royal Institute of Technology; 2016, IEEE, consisting of 7-pages.

Chinese Office Action with English machine translation dated Nov. 29, 2023 for Patent Application No. 201980061723.3, consisting of 10-pages.

* cited by examiner

US 11,963,227 B2

ENHANCED TIMING ADVANCED FILTERING

CROSS-REFERENCE TO RELATED APPLICATIONS

This application is a Submission Under 35 U.S.C. § 371 for U.S. National Stage Patent Application of International Application No.: PCT/SE2019/050840, filed Sep. 6, 2019 entitled "ENHANCED TIMING ADVANCED FILTERING," which claims priority to U.S. Provisional Application No. 62/734,811, filed Sep. 21, 2018, the entireties of both of which are incorporated herein by reference.

TECHNICAL FIELD

Methods and systems for random access in communication systems including New Radio (NR), Narrowband Internet of Things (NB-IoT), LTE for Machines (LTE-M), and LTE are disclosed.

BACKGROUND

The method of Delay Estimation based Random Access (DERA) has been previously proposed. According to such method, the standard Long Term Evolution (LTE) random access scheme is improved to account better for capacity overload on the random access channel. In brief, DERA presents a method to use a propagation delay in a signal to enable a User Equipment (UE) to deduce if the UE is the intended receiver of a second message (MSG2), which is a Random Access Response (RAR), from a Base Station (BS) by comparing the propagation delay estimated by the BS, i.e., the Timing Advance value ($T_A$) in the RAR, to the propagation delay estimated by the UE.

If the estimated propagation delay by the UE is reasonably close (within +/− a value from) to the propagation delay estimate ($T_A$ value) estimated by the Base Station (BS), the RAR is interpreted as intended for the UE. If not, the UE considers the RAR as being intended for another UE.

In the previously proposed method, the UE derives the propagation delay by assuming a fixed processing time at the BS and assuming that the BS replies instantly upon completion of the processing.

The procedure according to DERA is illustrated in FIG. 1. In step 100 the Random Access (RA) preamble is transmitted to the eNodeB from a machine-type communication (MTC) Device. In step 100A, the eNodeB estimates the propagation delay between the devices based on signature arrival times. In step 102, the eNodeB responds to the RA preamble with a Random Access Response (RAR), which includes the estimated propagation delay. On the arrival of the RAR, in step 102A, the MTC Device compares its estimated propagation delay with the propagation delay received from the eNodeB in the RAR message. If the difference falls outside an expected range, in step 102B, the MTC Device proceeds to backoff and start again. If the difference falls within an expected range, the MTC Device assumes the reservation asserted by the RA preamble has been received without collision, and goes to step 104. In step 104, the MTC Device transmits a scheduled transmission. In step 106, the eNodeB responds to the scheduled transmission with a contention resolution signal.

DERA is found to be beneficial to quickly provide feedback to the UE that the random access attempt was unsuccessful and that the UE should try again. This enables the UE to avoid proceeding with transmission of a third message (MSG3). Hence, resolving the preamble collision at an early stage, and hence saving battery power.

The analysis and simulation results of the previously proposed DERA procedure show good performance of the proposed solutions in terms of random access success rate for highly loaded systems, in terms of access delay, and hence of saving battery in the UEs.

SUMMARY

Methods for providing more efficient contention resolution between random access attempts in a highly loaded system to reduce access delays and increase battery life of User Equipment (UEs) is disclosed. Embodiments disclosed herein include a method implemented in a UE for a cellular communication system. The method includes transmitting a Random Access (RA) preamble and receiving a Random Access Response, RAR, from a BS containing information indicative of an added time delay, $T_F$, between reception of the preamble by the BS and transmission of the RAR by the BS. In some embodiments, the information indicative of the $T_F$ between the reception of the RA preamble by the BS and the transmission of the RAR by the BS comprises a value that corresponds to the $T_F$.

In some embodiments, the RAR further includes a timing advance, $T_A$, value indicative of radio signal propagation delay between the UE and the BS. In some embodiments, the UE implements a further step of determining a reference time, $T_R$, value indicative of a time between transmitting the RAR preamble and receiving the RAR. In some embodiments, the UE may also include a step of determining a value, $T_{ERR}$, that is the absolute value of a difference between the $T_R$ value and the sum of the $T_A$ value and the $T_F$ value. Some embodiments may also include a step of determining if the $T_{ERR}$ is greater than a predetermined threshold, $T_{THRESHOLD}$, thereby indicating that the RAR is not intended for the UE. Some embodiments include indicating that the RAR is not intended for the UE in response to determining the $T_{ERR}$ is greater than $T_{THRESHOLD}$. Embodiments may further include a step of determining if $T_{ERR}$ is less than or equal to the $T_{THRESHOLD}$, thereby indicating that the RAR is intended for the UE. Embodiments include indicating that the RAR is intended for the UE in response to determining $T_{ERR}$ is less than or equal to $T_{THRESHOLD}$. In some embodiments, the information indicative of the $T_F$ between the reception of the RA preamble by the BS and the transmission of the RAR by the BS further comprises information indicative of a number of at least one of units of time, transmission time intervals (TTIs), slots, and symbols. In some embodiments the information indicative of the $T_F$ between the reception of the RA preamble by the BS and the transmission of the RAR by the BS further comprises information indicative of a set of parameters needed by the UE to reconstruct, deduce, compute or estimate the $T_F$. In some embodiments, the information indicative of the $T_F$ is a combination of a number TT's and a number of units of time. In some embodiments, the method further includes the UE transmitting a RA MSG3 to the BS based on the $T_F$.

Embodiments disclosed herein include a UE for a cellular communication system. The UE is configured to transmit a Random Access (RA) preamble and receive a Random Access Response, RAR, from a BS containing information indicative of an added time delay, $T_F$, between the reception of the preamble by the BS and the transmission of the RAR by the BS. In some embodiments, the information indicative of the $T_F$ between the reception of the RA preamble by the BS and the transmission of the RAR by the BS includes receiving a time value the information indicative of the added $T_F$ comprises a value that corresponds to the $T_F$.

In some embodiments, the RAR further includes a timing advance, $T_A$, value indicative of radio signal propagation delay between the UE and BS. In some embodiments, the UE is further configured to determine a reference time, $T_R$, value indicative of time between transmitting the RAR preamble and receiving the RAR. In some embodiments, the UE is further configured to determine difference value, $T_{ERR}$, that is the absolute value of a difference between $T_R$ value and the sum of $T_A$ value and $T_F$ value. In some embodiments, the UE is further configured to determine if $T_{ERR}$ is greater than a predetermined threshold, $T_{THRESHOLD}$, thereby indicating that the RAR is not intended for the UE. In some embodiments, the RAR is not intended for the UE in response to determining $T_{ERR}$ is greater than $T_{THRESHOLD}$. In some embodiments, the UE is further configured to determine if $T_{ERR}$ is less than or equal to $T_{THRESHOLD}$, thereby indicating that the RAR is intended for the UE. In some embodiments, the UE is further configured to indicate that the RAR is intended for the UE in response to determining $T_{ERR}$ is less than or equal to $T_{THRESHOLD}$. In some embodiments, the information indicative of the $T_F$ between the reception of the RA preamble by the BS and the transmission of the RAR by the BS further comprises information indicative of a number of at least one of units of time, transmission time intervals (TTIs), slots, and symbols. In some embodiments the information indicative of the $T_F$ between the reception of the RA preamble by the BS and transmission of the RAR by the BS further comprises information indicative of a set of parameters needed by the UE to reconstruct, deduce, compute or estimate the $T_F$. In some embodiments, the information indicative of the $T_F$ is a combination of a number TT's and a number of units of time. In some embodiments, the UE is further configured to transmit a RA MSG3 to the BS based on the $T_F$.

Another embodiment disclosed herein includes a method performed by a BS for a cellular communication system. The method includes steps of receiving an RA preamble from a UE, and generating information indicative of a $T_F$ between the reception of the preamble by the BS and start of a transmission of a RAR. In some embodiments, the RAR further comprises a timing advance, $T_A$, value indicative of radio signal propagation delay between the UE and BS. In some embodiments, the method includes estimating the timing advance, $T_A$, value indicative of radio signal propagation delay between the UE and BS. In some embodiments the information indicative of an added time the information indicating the added time delay is a value that corresponds to the added time delay. In some embodiments, the information indicating the added time delay between the reception of the preamble by the BS and the start of transmission of the RAR comprises a number of at least one of units of time, transmission time intervals (TTIs), slots, and symbols. In some embodiments, the information indicating the added time delay comprises a set of parameters needed by the UE to reconstruct, deduce, compute, or estimate the $T_F$. In some embodiments, the information indicating the added time delay comprises a combination of a number of TTIs and a number of units of time. In some embodiments, the method further comprises receiving, from the UE, a RA MSG3 based on the $T_F$.

Another embodiment disclosed herein includes a BS for a cellular communication system. The BS is configured to receive an RA preamble from a UE, and generate information indicative of an added time delay, $T_F$, between the reception of the preamble by the BS and start of a transmission of a RAR. In some embodiments, the RAR further comprises a timing advance, $T_A$, value indicative of radio signal propagation delay between the UE and BS. In some embodiments, the BS is further configured to estimate the timing advance, $T_A$, value indicative of radio signal propagation delay between the UE and BS. In some embodiments the information indicative of an added time the information indicating the added time delay is a value that corresponds to the added time delay. In some embodiments, the information indicating the added time delay between the reception of the preamble by the BS and the start of transmission of the RAR comprises a number of at least one of units of time, transmission time intervals (TTIs), slots, and symbols. In some embodiments, the information indicating the added time delay comprises a set of parameters needed by the UE to reconstruct, deduce, compute, or estimate the $T_F$. In some embodiments, the information indicating the added time delay comprises a combination of a number of TTIs and a number of units of time. In some embodiments, the BS is further configured to receive, from the UE, a RA MSG3 based on the $T_F$.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

There currently exist certain challenges with the previously proposed delay estimation random access (DERA) procedure. One problem with the previously proposed DERA procedure is that the calculation for estimation of the propagation delay in the User Equipment (UE) is based on the Base Station (BS) having a predictable and fixed processing delay, which is not the case. In other words, the BS does not have a predictable and fixed processing delay that allows an accurate and useful estimation of a total delay of communication between the BS and the UE.

In addition, DERA assumes an unslotted downlink for the estimation, since the BS is assumed to reply with the Random Access Response (RAR) immediately upon completion of the processing. This is in contrast to all Third Generation Partnership Project (3GPP) systems, which have slot-based downlink transmissions, causing an unpredictable delay between the arrival of the Random Access (RA) preamble and the transmission of the RAR. Hence, the DERA solution is not applicable in the current form to New Radio (NR), Narrowband Internet of Things (NB-IoT), LTE for Machines (LTE-M), and LTE.

Figure 1:
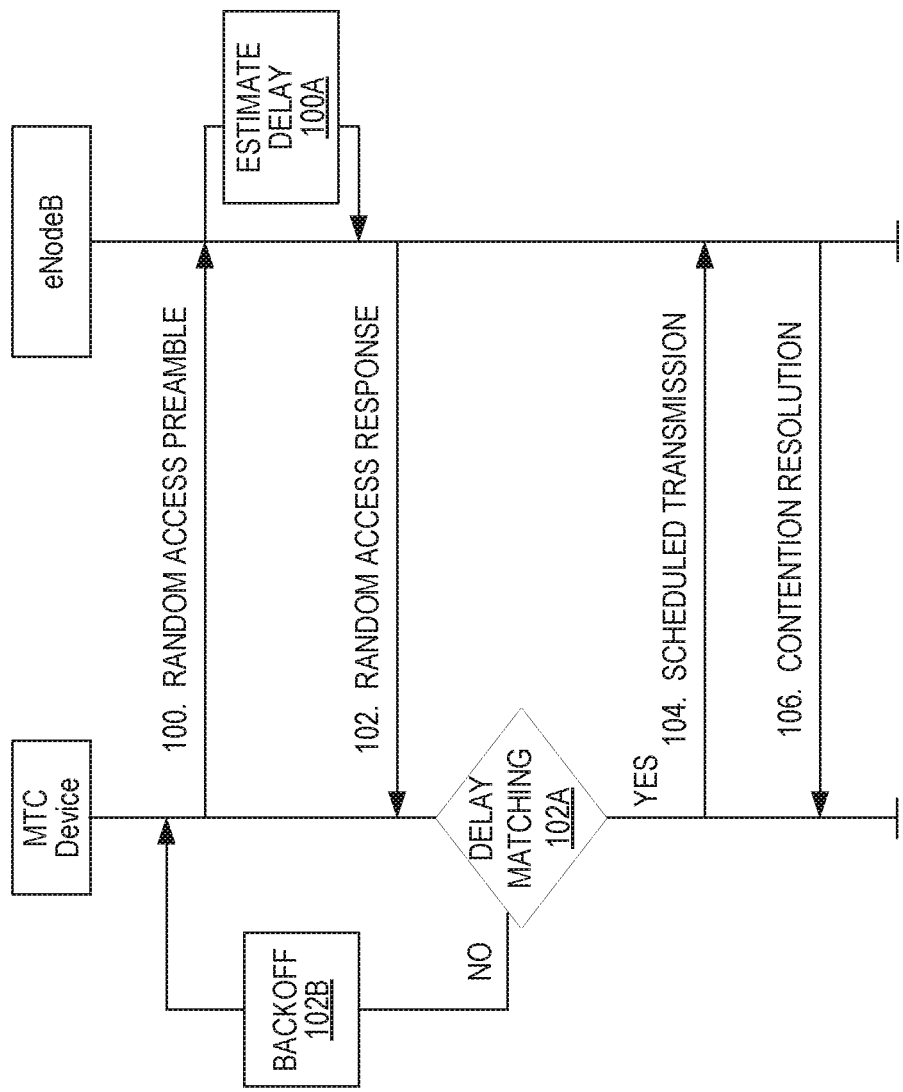
FIG. 1 is a signaling diagram of a previously proposed Delay Estimation based Random Access (DERA) procedure between a machine-type communication (MTC) device and an eNodeB.
Figure 2:
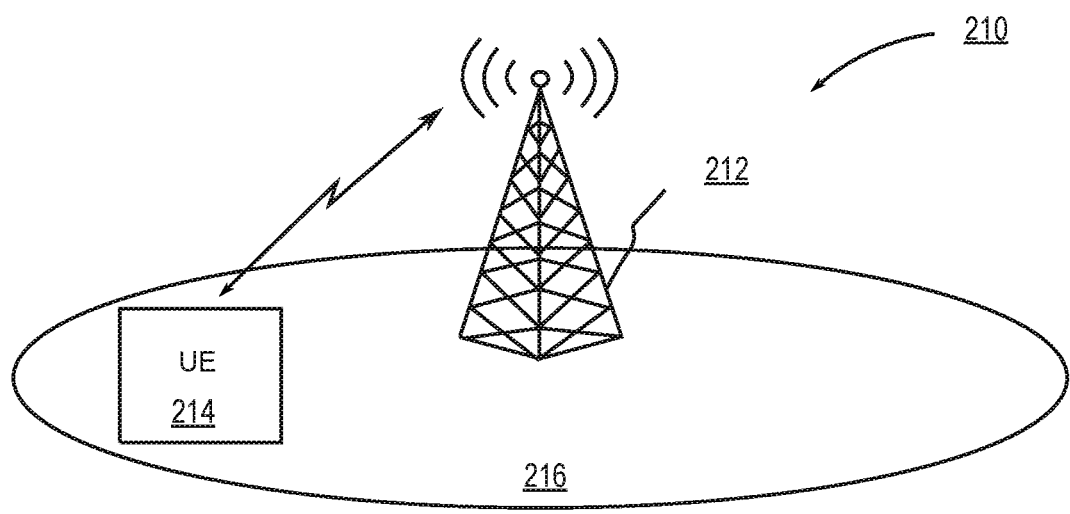
FIG. 2 is a diagram depicting a communication system that includes a Base Station (BS) and a User Equipment (UE) within a cell.

Certain aspects of the present disclosure and their embodiments may provide solutions to these and/or other challenges. FIG. 2 is a diagram depicting a communication system 210 that, in accordance with the present disclosure, includes a BS 212 and a UE 214 within a cell 216. Embodiments of the present disclosure enable the DERA solution in slotted communication systems, e.g., in NB-IoT, LTE-M, LTE evo, NR, etc., by providing the UE 214 with information in the RAR to allow it to carry out an accurate estimate of the timing advance ($T_A$) that is independent from the $T_A$ estimate estimated by the BS 212.

An overview of one embodiment of the disclosed procedure (using a first method of $T_A$ filtering using the $T_A$ value) includes the following steps:
1. The BS adds an 'added time delay' ($T_F$) value, to the random access response (this is the required update to the standard specification). This information is transmitted in the RAR. In this embodiment, the $T_F$ value is transmitted along with the $T_A$ value (which is transmitted according to current 3GPP specifications). The 'added time delay' ($T_F$) is defined as the duration from receiving the start of the RA preamble sent by the UE to the time where the BS will start transmitting the RAR.
2. The UE uses the $T_A$ value and the $T_F$ value to accurately estimate the propagation delay.
3. The UE compares the estimated propagation delay twice with the $T_A$ value provided by the BS in the RAR, and calculates the difference D.
4. If the difference D is less than a threshold T, the UE considers the RAR to be intended for the UE. The UE then continues with the random access procedure. Otherwise, if the difference D is bigger than or equal to the threshold T, the UE deduces that the RAR is not intended for itself, and discontinues the random access procedure.

One embodiment of the disclosed procedure for $T_A$ filtering is as follows:
1. The UE transmits the RA preamble;
2. The BS determines the time from reception of the RA preamble to the transmission of the RAR, $T_F$;
3. The BS indicates the $T_F$ in the RAR together with $T_A$ (For example, the BS transmits a RAR that includes both the $T_F$ value and the $T_A$ value);
4. The UE receives the RAR;
5. The UE determines the time between transmission of the RA preamble and the reception of the RAR to determine a reference time, $T_R$;
6. The UE compares the received $T_A+T_F$ with the determined reference time, $T_R$;
7. The UE, if $T_A+T_F$ differs from $T_R$ by more than a threshold amount (e.g., $T_{ERR}=|T_R-(T_A+T_F)|>T_{threshold}$), considers the response to be intended for another UE or invalid; and
8. The UE alternatively/additionally, if $T_A+T_F$ differs from $T_R$ by less than or equal to the threshold amount (e.g., $T_{ERR}=|T_R-(T_A+T_F)|<=T_{threshold}$), considers the response to be intended for itself or valid.

Figure 3:
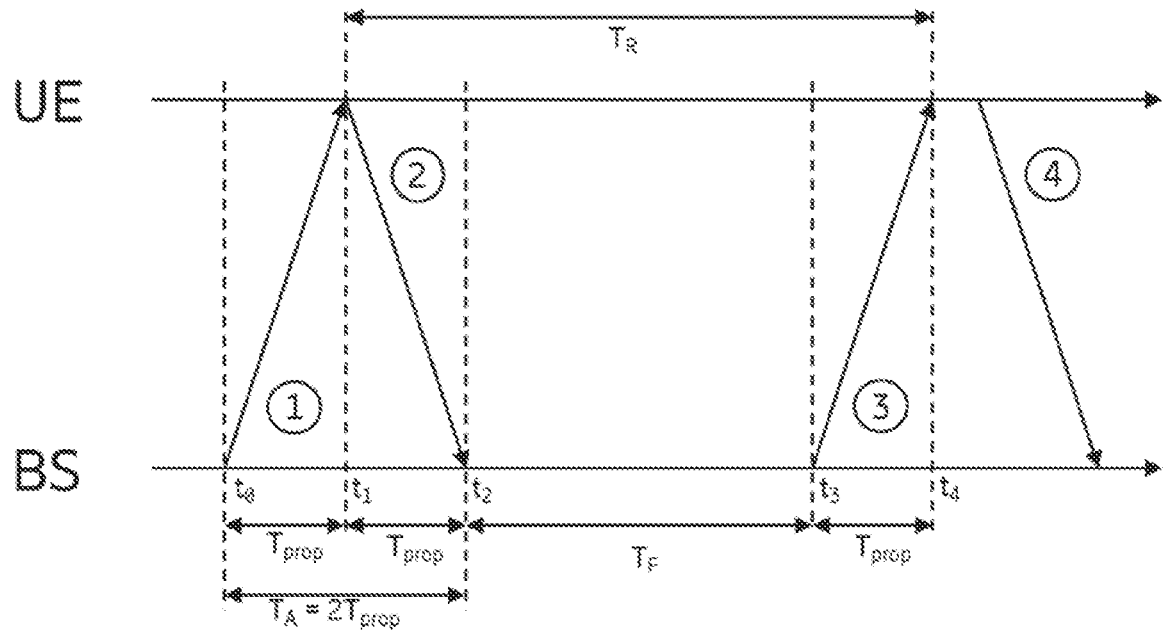
FIG. 3 is a diagram that illustrates various times that are calculated and transmitted in the DERA procedure.

In another embodiment, the UE derives the $T_A$ value or propagation delay locally and compares with the $T_A$ value provided in the RAR (as described above). FIG. 3 is a diagram that illustrates the random access procedure in which various times are calculated and one or more of those times is transmitted in the RAR. Steps of the random access procedure as shown in FIG. 3 are as follows:
1. DL (downlink) signal (e.g., SS) ($T_{PROP}=t_0$ to $t_1$);
2. RA preamble ($T_{PROP}=t_1$ to $t_2$);
3. RAR (with $T_A$) ($T_{PROP}=t_3$ to $t_4$); and
4. RA MSG3 (with UE identifier).

Note that $T_F$ is the time between the BS receiving the RA preamble at $t_2$ and transmitting the RAR at $t_3$. The UE determines $T_R=T_{prop}+T_F+T_{prop}=T_A+T_F$. SS above indicates the system synchronization signal.

Certain embodiments may provide one or more of the following technical advantage(s). Embodiments of the present disclosure allow random access attempts to be filtered using the timing advance, $T_A$, in 3GPP systems already at the reception of the RAR, that is MSG2; hence, detecting and dealing with collisions at an early stage.

Embodiments of the present disclosure enable using the DERA procedure in time slotted systems. In addition, it enhances the accuracy of the UE propagation delay estimate in all systems.

The DERA procedure has benefits of providing more efficient contention resolution in highly loaded systems, enabling battery saving, higher random access success rates, and shorter random access delays for UEs.

Embodiments of the present disclosure allow dynamically turning on and off signaling used to enable the $T_A$ filtering.

Signaling Reduction Options Covered by the Present Disclosure

In some embodiments of the disclosure, an indication from the BS to the UE with regard to $T_F$ is a representation of $T_F$ or information indicative of $T_F$. The representation or information indicative of $T_F$ may be a representation expressed in time units such as, e.g., milliseconds (ms), microseconds (μs), or nanoseconds (ns). It may also be expressed in terms of a number of, e.g., Transmission Time Intervals (TTIs), slots, or symbols. To limit signaling overhead, the representation or information indicative of $T_F$ may be limited to a set of parameters which is needed to reconstruct/deduce/compute/estimate $T_F$ at the UE, but which the UE cannot derive itself and/or is not otherwise known to the UE.

In an embodiment, the BS signals only n and delta in the RAR, where $T_F=n*T_{tti}+delta$, and $T_{tti}$ is the TTI duration in the current system configuration. This approach reduces the number of bits that are needed to be added to the RAR. Other compression forms for signaling $T_F$ in the RAR can also be envisioned and are covered by the present disclosure.

In one embodiment, the $T_F$ signaled in the RAR comprises only the delta, and a sanity check is made in the UE about the derived propagation delay by testing various integer values of n. In other words, only the delta is signaled in the RAR, and a validity check is calculated by the UE pertaining to the derived propagation delay, e.g., by testing various integer values of n, e.g., by way of a digital processor included in the UE. The corresponding propagation distance (multiply the time by the propagation speed, c=speed of light) should be reasonable, e.g., within a cell of a BS communicating with the UE, and not too small. In one embodiment, this is done by assuming an n, e.g., 1 or even 0, multiplying the propagation delay with the speed of light, and checking if the propagation distance falls within a predetermined (reasonable) cell radius, e.g., below a distance threshold and above another distance threshold. If not, then n is increased to the next integer value and the sanity check is redone until the condition for 'reasonable'/'sanity' holds. For example, if not, then n is increased to the next integer value and the validity check is recalculated until the UE determines both that the corresponding propagation distance is within the cell and also not impractically small.

The accuracy of the signaled $T_F$ can then be adjusted to the Random Access Channel (RACH) load in the system. A higher load leads to a higher accuracy of the $T_F$, and a lower load leads to a more coarse representation of $T_F$.

Yet another approach is, since typically supported $T_{prop}$ and/or $T_A$ are smaller than the TTI, to reduce the signaling overhead and/or improve resolution/accuracy, in one embodiment, signaling $T_F'$ (omitting integer TT's of $T_F$) instead of $T_F$ is used.

Turning $T_A$ Filtering on and Off

In one embodiment, $T_A$ filtering can be turned on when needed, i.e., when the load on the RACH increases beyond a certain threshold, or off, i.e., in situations of low load. In an exemplary embodiment, the presence or absence of the $T_F$ value in the RAR controls turning $T_A$ filtering on and off. For example, the presence of the $T_F$ value in the RAR turns $T_A$ filtering on, whereas absence of the $T_F$ value in the RAR turns $T_A$ filtering off.

Figure 4:
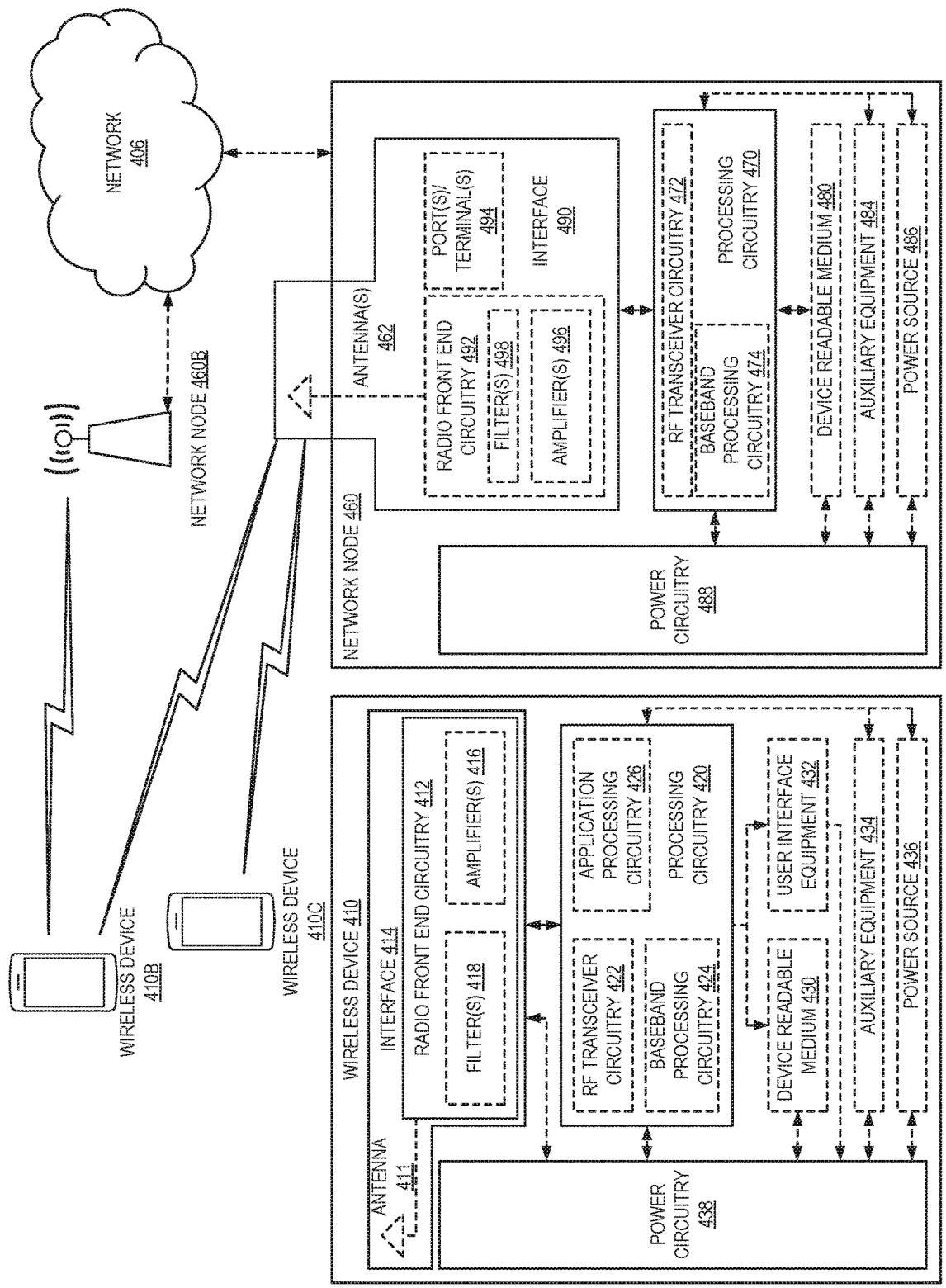
FIG. 4 illustrates one example of a wireless network in which embodiments of the present disclosure may be implemented.

Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts a network 406, network nodes 460 and 460B, and wireless devices 410, 410B, and 410C. In practice, a wireless network may further include any additional elements suitable to support communication between wireless devices or between a wireless device and another communication device, such as a landline telephone, a service provider, or any other network node or end device. Of the illustrated components, the network node 460 and the wireless device 410 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), LTE, and/or other suitable Second, Third, Fourth, or Fifth Generation (2G, 3G, 4G, or 5G) standards; Wireless Local Area Network (WLAN) standards, such as the IEEE 802.11 standards; and/or any other appropriate wireless communication standard, such as the Worldwide Interoperability for Microwave Access (WiMax), Bluetooth, Z-Wave, and/or ZigBee standards.

The network 406 may comprise one or more backhaul networks, core networks, Internet Protocol (IP) networks, Public Switched Telephone Networks (PSTNs), packet data networks, optical networks, Wide Area Networks (WANs), Local Area Networks (LANs), WLANs, wired networks, wireless networks, metropolitan area networks, and other networks to enable communication between devices.

The network node 460 and the wireless device 410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged, and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, Access Points (APs) (e.g., radio APs), BSs (e.g., radio base stations, Node Bs, evolved Node Bs (eNBs), and New Radio (NR) Base Stations (gNBs)). BSs may be categorized based on the amount of coverage they provide (or, stated differently, their transmit power level) and may then also be referred to as femto base stations, pico base stations, micro base stations, or macro base stations. A BS may be a relay node or a relay donor node controlling a relay. A network node may also include one or more (or all) parts of a distributed radio base station such as centralized digital units and/or Remote Radio Units (RRUs), sometimes referred to as Remote Radio Heads (RRHs). Such RRUs may or may not be integrated with an antenna as an antenna integrated radio. Parts of a distributed radio base station may also be referred to as nodes in a Distributed Antenna System (DAS). Yet further examples of network nodes include Multi-Standard Radio (MSR) equipment such as MSR BSs, network controllers such as Radio Network Controllers (RNCs) or BS Controllers (BSCs), Base Transceiver Stations (BTSs), transmission points, transmission nodes, Multi-Cell/Multicast Coordination Entities (MCEs), core network nodes (e.g., Mobile Switching Centers (MSCs), Mobility Management Entities (MMEs)), Operation and Maintenance (O&M) nodes, Operations Support System (OSS) nodes, Self-Organizing Network (SON) nodes, positioning nodes (e.g., Evolved Serving Mobile Location Center (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, the network node 460 includes processing circuitry 470, a device readable medium 480, an interface 490, auxiliary equipment 484, a power source 486, power circuitry 488, and an antenna 462. Although the network node 460 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of the network node 460 are depicted as single boxes located within a larger box, or nested within multiple boxes, in practice, a network node may comprise multiple different physical components that make up a single illustrated component (e.g., the device readable medium 480 may comprise multiple separate hard drives as well as multiple Random Access Memory (RAM) modules).

Similarly, the network node 460 may be composed of multiple physically separate components (e.g., a Node B component and a RNC component, or a BTS component and a BSC component, etc.), which may each have their own respective components. In certain scenarios in which the network node 460 comprises multiple separate components (e.g., BTS and BSC components), one or more of the separate components may be shared among several network nodes. For example, a single RNC may control multiple Node Bs. In such a scenario, each unique Node B and RNC pair may in some instances be considered a single separate network node. In some embodiments, the network node 460 may be configured to support multiple Radio Access Technologies (RATs). In such embodiments, some components may be duplicated (e.g., a separate device readable medium 480 for the different RATs) and some components may be reused (e.g., the same antenna 462 may be shared by the RATs). The network node 460 may also include multiple sets of the various illustrated components for different wireless technologies integrated into the network node 460, such as, for example, GSM, Wideband Code Division Multiple Access (WCDMA), LTE, NR, WiFi, or Bluetooth wireless technologies. These wireless technologies may be integrated into the same or a different chip or set of chips and other components within the network node 460.

The processing circuitry 470 is configured to perform any determining, calculating, or similar operations (e.g., certain obtaining operations) described herein as being provided by a network node. These operations performed by the processing circuitry 470 may include processing information obtained by the processing circuitry 470 by, for example, converting the obtained information into other information, comparing the obtained information or converted information to information stored in the network node, and/or performing one or more operations based on the obtained information or converted information, and as a result of said processing making a determination.

The processing circuitry 470 may comprise a combination of one or more of a microprocessor, a controller, a microcontroller, a Central Processing Unit (CPU), a Digital Signal Processor (DSP), an Application Specific Integrated Circuit (ASIC), a Field Programmable Gate Array (FPGA), or any other suitable computing device, resource, or combination of hardware, software, and/or encoded logic operable to provide, either alone or in conjunction with other network node 460 components, such as the device readable medium 480, network node 460 functionality. For example, the processing circuitry 470 may execute instructions stored in the device readable medium 480 or in memory within the processing circuitry 470. Such functionality may include providing any of the various wireless features, functions, or benefits discussed herein. In some embodiments, the processing circuitry 470 may include a System on a Chip (SOC).

In some embodiments, the processing circuitry 470 may include one or more of Radio Frequency (RF) transceiver circuitry 472 and baseband processing circuitry 474. In some embodiments, the RF transceiver circuitry 472 and the baseband processing circuitry 474 may be on separate chips (or sets of chips), boards, or units, such as radio units and digital units. In alternative embodiments, part or all of the RF transceiver circuitry 472 and the baseband processing circuitry 474 may be on the same chip or set of chips, boards, or units.

In certain embodiments, some or all of the functionality described herein as being provided by a network node, base station, eNB, or other such network device may be performed by the processing circuitry 470 executing instructions stored on the device readable medium 480 or memory within the processing circuitry 470. In alternative embodiments, some or all of the functionality may be provided by the processing circuitry 470 without executing instructions stored on a separate or discrete device readable medium, such as in a hard-wired manner. In any of those embodiments, whether executing instructions stored on a device readable storage medium or not, the processing circuitry 470 can be configured to perform the described functionality. The benefits provided by such functionality are not limited to the processing circuitry 470 alone or to other components of the network node 460, but are enjoyed by the network node 460 as a whole, and/or by end users and the wireless network generally.

The device readable medium 480 may comprise any form of volatile or non-volatile computer readable memory including, without limitation, persistent storage, solid state memory, remotely mounted memory, magnetic media, optical media, RAM, Read Only Memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by the processing circuitry 470. The device readable medium 480 may store any suitable instructions; data or information, including a computer program; software; an application including one or more of logic, rules, code, tables, etc.; and/or other instructions capable of being executed by the processing circuitry 470 and utilized by the network node 460. The device readable medium 480 may be used to store any calculations made by the processing circuitry 470 and/or any data received via the interface 490. In some embodiments, the processing circuitry 470 and the device readable medium 480 may be considered to be integrated.

The interface 490 is used in the wired or wireless communication of signaling and/or data between the network node 460, a network 406, and/or wireless devices 410. As illustrated, the interface 490 comprises one or more ports or terminals 494 to send and receive data, for example, to and from the network 406 over a wired connection. The interface 490 also includes radio front end circuitry 492 that may be coupled to, or in certain embodiments a part of, the antenna 462. The radio front end circuitry 492 comprises filters 498 and amplifiers 496. The radio front end circuitry 492 may be connected to the antenna 462 and the processing circuitry 470. The radio front end circuitry 492 may be configured to condition signals communicated between the antenna 462 and the processing circuitry 470. The radio front end circuitry 492 may receive digital data that is to be sent out to other network nodes or wireless devices via a wireless connection. The radio front end circuitry 492 may convert the digital data into a radio signal having the appropriate channel and bandwidth parameters using a combination of the filters 498 and/or the amplifiers 496. The radio signal may then be transmitted via the antenna 462. Similarly, when receiving data, the antenna 462 may collect radio signals which are then converted into digital data by the radio front end circuitry 492. The digital data may be passed to the processing circuitry 470. In other embodiments, the interface 490 may comprise different components and/or different combinations of components.

In certain alternative embodiments, the network node 460 may not include separate radio front end circuitry 492; instead, the processing circuitry 470 may comprise radio front end circuitry and may be connected to the antenna 462 without separate radio front end circuitry 492. Similarly, in some embodiments, all or some of the RF transceiver circuitry 472 may be considered a part of the interface 490. In still other embodiments, the interface 490 may include the one or more ports or terminals 494, the radio front end circuitry 492, and the RF transceiver circuitry 472 as part of a radio unit (not shown), and the interface 490 may communicate with the baseband processing circuitry 474, which is part of a digital unit (not shown).

The antenna 462 may include one or more antennas, or antenna arrays, configured to send and/or receive wireless signals. The antenna 462 may be coupled to the radio front end circuitry 492 and may be any type of antenna capable of transmitting and receiving data and/or signals wirelessly. In some embodiments, the antenna 462 may comprise one or more omni-directional, sector, or panel antennas operable to transmit/receive radio signals between, for example, 2 gigahertz (GHz) and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as Multiple Input Multiple Output (MIMO). In certain embodiments, the antenna 462 may be separate from the network node 460 and may be connectable to the network node 460 through an interface or port.

The antenna 462, the interface 490, and/or the processing circuitry 470 may be configured to perform any receiving operations and/or certain obtaining operations described herein as being performed by a network node. Any information, data, and/or signals may be received from a wireless device, another network node, and/or any other network equipment. Similarly, the antenna 462, the interface 490, and/or the processing circuitry 470 may be configured to perform any transmitting operations described herein as being performed by a network node. Any information, data, and/or signals may be transmitted to a wireless device, another network node, and/or any other network equipment.

The power circuitry 488 may comprise, or be coupled to, power management circuitry and is configured to supply the components of the network node 460 with power for performing the functionality described herein. The power circuitry 488 may receive power from the power source 486. The power source 486 and/or the power circuitry 488 may be configured to provide power to the various components of the network node 460 in a form suitable for the respective components (e.g., at a voltage and current level needed for each respective component). The power source 486 may either be included in, or be external to, the power circuitry 488 and/or the network node 460. For example, the network node 460 may be connectable to an external power source (e.g., an electricity outlet) via an input circuitry or interface such as an electrical cable, whereby the external power source supplies power to the power circuitry 488. As a further example, the power source 486 may comprise a source of power in the form of a battery or battery pack which is connected to, or integrated in, the power circuitry 488. The battery may provide backup power should the external power source fail. Other types of power sources, such as photovoltaic devices, may also be used.

Alternative embodiments of the network node 460 may include additional components beyond those shown in FIG. 4 that may be responsible for providing certain aspects of the network node's functionality, including any of the functionality described herein and/or any functionality necessary to support the subject matter described herein. For example, the network node 460 may include user interface equipment to allow input of information into the network node 460 and to allow output of information from the network node 460. This may allow a user to perform diagnostic, maintenance, repair, and other administrative functions for the network node 460.

As used herein, wireless device refers to a device capable, configured, arranged, and/or operable to communicate wirelessly with network nodes and/or other wireless devices. Unless otherwise noted, the term wireless device may be used interchangeably herein with UE. Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a Voice over IP (VoIP) phone, a wireless local loop phone, a desktop computer, a Personal Digital Assistant (PDA), a wireless camera, a gaming console or device, a music storage device, a playback appliance, a wearable terminal device, a wireless endpoint, a mobile station, a tablet, a laptop, Laptop Embedded Equipment (LEE), Laptop Mounted Equipment (LME), a smart device, a wireless Customer Premise Equipment (CPE), a vehicle mounted wireless terminal device, etc. A wireless device may support Device-to-Device (D2D) communication, for example, by implementing a 3GPP standard for sidelink communication, Vehicle-to-Vehicle (V2V) communication, Vehicle-to-Infrastructure (V2I) communication, and Vehicle-to-Everything (V2X) communication, and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a Machine-to-Machine (M2M) device, which may in a 3GPP context be referred to as a machine-type communication (MTC) device. As one particular example, the wireless device may be a UE implementing the 3GPP NB-IoT standard. Particular examples of such machines or devices are sensors, metering devices such as power meters, industrial machinery, home or personal appliances (e.g., refrigerators, televisions, etc.), or personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated in FIG. 4, a wireless device 410 includes an antenna 411, an interface 414, processing circuitry 420, a device readable medium 430, user interface equipment 432, auxiliary equipment 434, a power source 436, and power circuitry 438. The wireless device 410 may include multiple sets of one or more of the illustrated components for different wireless technologies supported by the wireless device 410, such as, for example, GSM, WCDMA, LTE, NR, WiFi, WiMAX, or Bluetooth wireless technologies, just to mention a few. These wireless technologies may be integrated into the same or different chips or set of chips as other components within the wireless device 410.

The antenna 411 may include one or more antennas or antenna arrays configured to send and/or receive wireless signals and is connected to the interface 414. In certain alternative embodiments, the antenna 411 may be separate from the wireless device 410 and be connectable to the wireless device 410 through an interface or port. The antenna 411, the interface 414, and/or the processing circuitry 420 may be configured to perform any receiving or transmitting operations described herein as being performed by a wireless device. Any information, data, and/or signals may be received from a network node and/or another wireless device. In some embodiments, radio front end circuitry and/or the antenna 411 may be considered an interface.

As illustrated, the interface 414 comprises radio front end circuitry 412 and the antenna 411. The radio front end circuitry 412 comprises one or more filters 418 and amplifiers 416. The radio front end circuitry 412 is connected to the antenna 411 and the processing circuitry 420 and is configured to condition signals communicated between the antenna 411 and the processing circuitry 420. The radio front end circuitry 412 may be coupled to or be a part of the antenna 411. In some embodiments, the wireless device 410 may not include separate radio front end circuitry 412; rather, the processing circuitry 420 may comprise radio front end circuitry and may be connected to the antenna 411. Similarly, in some embodiments, some or all of RF transceiver circuitry 422 may be considered a part of the interface 414. The radio front end circuitry 412 may receive digital data that is to be sent out to other network nodes or wireless devices via a wireless connection. The radio front end circuitry 412 may convert the digital data into a radio signal having the appropriate channel and bandwidth parameters using a combination of the filters 418 and/or the amplifiers 416. The radio signal may then be transmitted via the antenna 411. Similarly, when receiving data, the antenna 411 may collect radio signals which are then converted into digital data by the radio front end circuitry 412. The digital data may be passed to the processing circuitry 420. In other embodiments, the interface 414 may comprise different components and/or different combinations of components.

The processing circuitry 420 may comprise a combination of one or more of a microprocessor, a controller, a microcontroller, a CPU, a DSP, an ASIC, a FPGA, or any other suitable computing device, resource, or combination of hardware, software, and/or encoded logic operable to provide, either alone or in conjunction with other wireless device 410 components, such as the device readable medium 430, wireless device 410 functionality. Such functionality may include providing any of the various wireless features or benefits discussed herein. For example, the processing circuitry 420 may execute instructions stored in the device readable medium 430 or in memory within the processing circuitry 420 to provide the functionality disclosed herein.

As illustrated, the processing circuitry 420 includes one or more of the RF transceiver circuitry 422, baseband processing circuitry 424, and application processing circuitry 426. In other embodiments, the processing circuitry 420 may comprise different components and/or different combinations of components. In certain embodiments, the processing circuitry 420 of the wireless device 410 may comprise a SOC. In some embodiments, the RF transceiver circuitry 422, the baseband processing circuitry 424, and the application processing circuitry 426 may be on separate chips or sets of chips. In alternative embodiments, part or all of the baseband processing circuitry 424 and the application processing circuitry 426 may be combined into one chip or set of chips, and the RF transceiver circuitry 422 may be on a separate chip or set of chips. In still alternative embodiments, part or all of the RF transceiver circuitry 422 and the baseband processing circuitry 424 may be on the same chip or set of chips, and the application processing circuitry 426 may be on a separate chip or set of chips. In yet other alternative embodiments, part or all of the RF transceiver circuitry 422, the baseband processing circuitry 424, and the application processing circuitry 426 may be combined in the same chip or set of chips. In some embodiments, the RF transceiver circuitry 422 may be a part of the interface 414. The RF transceiver circuitry 422 may condition RF signals for the processing circuitry 420.

In certain embodiments, some or all of the functionality described herein as being performed by a wireless device may be provided by the processing circuitry 420 executing instructions stored on the device readable medium 430, which in certain embodiments may be a computer-readable storage medium. In alternative embodiments, some or all of the functionality may be provided by the processing circuitry 420 without executing instructions stored on a separate or discrete device readable storage medium, such as in a hard-wired manner. In any of those particular embodiments, whether executing instructions stored on a device readable storage medium or not, the processing circuitry 420 can be configured to perform the described functionality. The benefits provided by such functionality are not limited to the processing circuitry 420 alone or to other components of the wireless device 410, but are enjoyed by the wireless device 410 as a whole, and/or by end users and the wireless network generally.

The processing circuitry 420 may be configured to perform any determining, calculating, or similar operations (e.g., certain obtaining operations) described herein as being performed by a wireless device. These operations, as performed by the processing circuitry 420, may include processing information obtained by the processing circuitry 420 by, for example, converting the obtained information into other information, comparing the obtained information or converted information to information stored by the wireless device 410, and/or performing one or more operations based on the obtained information or converted information, and as a result of said processing making a determination.

The device readable medium 430 may be operable to store a computer program; software; an application including one or more of logic, rules, code, tables, etc.; and/or other instructions capable of being executed by the processing circuitry 420. The device readable medium 430 may include computer memory (e.g., RAM or ROM), mass storage media (e.g., a hard disk), removable storage media (e.g., a CD or a DVD), and/or any other volatile or non-volatile, non-transitory device readable and/or computer executable memory devices that store information, data, and/or instructions that may be used by the processing circuitry 420. In some embodiments, the processing circuitry 420 and the device readable medium 430 may be considered to be integrated.

The user interface equipment 432 may provide components that allow for a human user to interact with the wireless device 410. Such interaction may be of many forms, such as visual, audial, tactile, etc. The user interface equipment 432 may be operable to produce output to the user and to allow the user to provide input to the wireless device 410. The type of interaction may vary depending on the type of user interface equipment 432 installed in the wireless device 410. For example, if the wireless device 410 is a smart phone, the interaction may be via a touch screen; if the wireless device 410 is a smart meter, the interaction may be through a screen that provides usage (e.g., the number of gallons used) or a speaker that provides an audible alert (e.g., if smoke is detected). The user interface equipment 432 may include input interfaces, devices, and circuits, and output interfaces, devices, and circuits. The user interface equipment 432 is configured to allow input of information into the wireless device 410, and is connected to the processing circuitry 420 to allow the processing circuitry 420 to process the input information. The user interface equipment 432 may include, for example, a microphone, a proximity or other sensor, keys/buttons, a touch display, one or more cameras, a Universal Serial Bus (USB) port, or other input circuitry. The user interface equipment 432 is also configured to allow output of information from the wireless device 410 and to allow the processing circuitry 420 to output information from the wireless device 410. The user interface equipment 432 may include, for example, a speaker, a display, vibrating circuitry, a USB port, a headphone interface, or other output circuitry. Using one or more input and output interfaces, devices, and circuits of the user interface equipment 432, the wireless device 410 may communicate with end users and/or the wireless network, and allow them to benefit from the functionality described herein.

The auxiliary equipment 434 is operable to provide more specific functionality which may not be generally performed by wireless devices. This may comprise specialized sensors for doing measurements for various purposes, interfaces for additional types of communication such as wired communications, etc. The inclusion and type of components of the auxiliary equipment 434 may vary depending on the embodiment and/or scenario.

The power source 436 may, in some embodiments, be in the form of a battery or battery pack. Other types of power sources, such as an external power source (e.g., an electricity outlet), photovoltaic devices, or power cells may also be used. The wireless device 410 may further comprise the power circuitry 438 for delivering power from the power source 436 to the various parts of the wireless device 410 which need power from the power source 436 to carry out any functionality described or indicated herein. The power circuitry 438 may in certain embodiments comprise power management circuitry. The power circuitry 438 may additionally or alternatively be operable to receive power from an external power source, in which case the wireless device 410 may be connectable to the external power source (such as an electricity outlet) via input circuitry or an interface such as an electrical power cable. The power circuitry 438 may also in certain embodiments be operable to deliver power from an external power source to the power source 436. This may be, for example, for the charging of the power source 436. The power circuitry 438 may perform any formatting, converting, or other modification to the power from the power source 436 to make the power suitable for the respective components of the wireless device 410 to which power is supplied.

Figure 5:
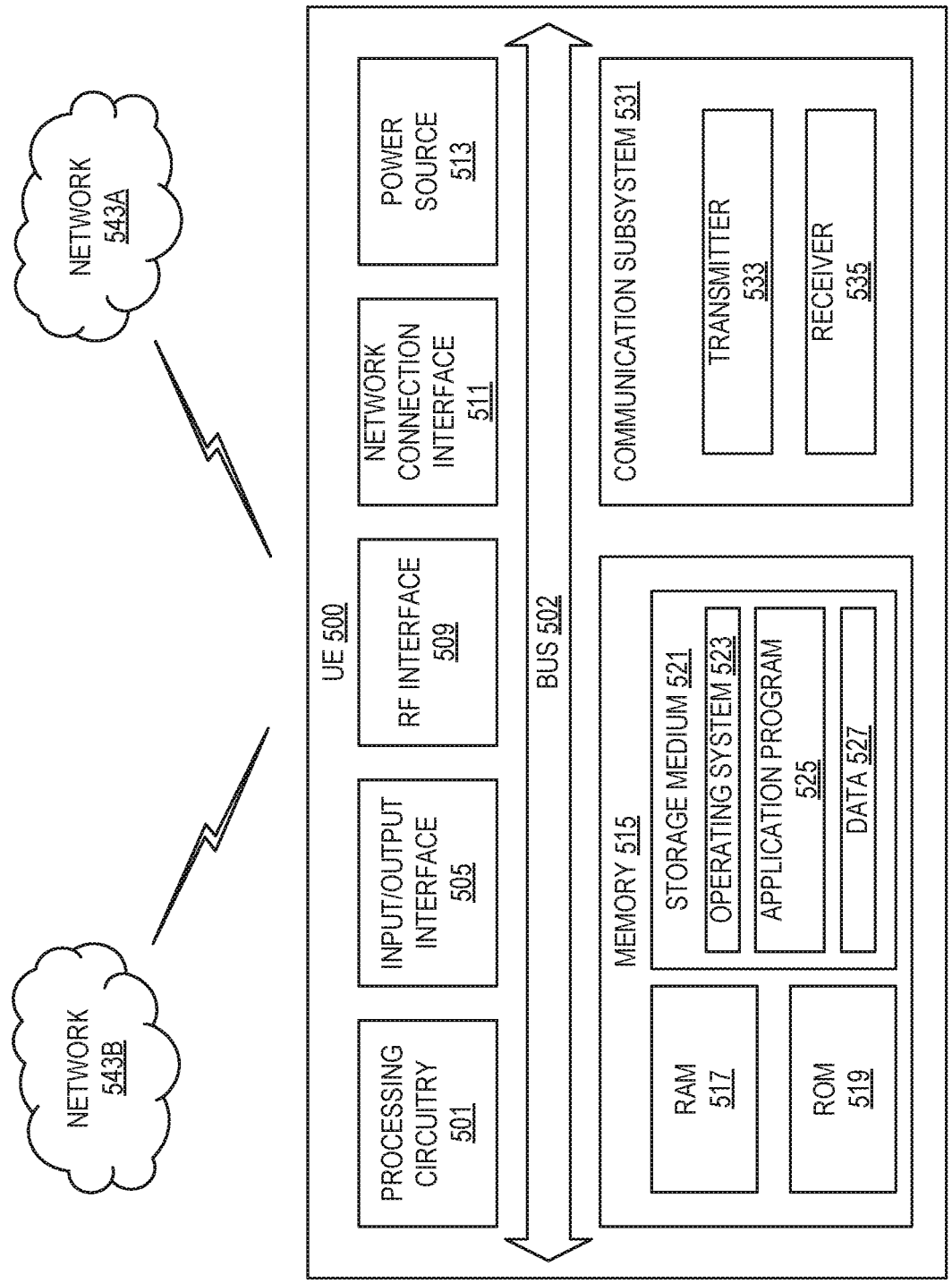
FIG. 5 illustrates one embodiment of a UE in accordance with various aspects of the present disclosure.

FIG. 5 illustrates one embodiment of a UE in accordance with various aspects described herein. As used herein, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). A UE 500 may be any UE identified by 3GPP, including a NB-IoT UE, a MTC UE, and/or an enhanced MTC (eMTC) UE. The UE 500, as illustrated in FIG. 5, is one example of a wireless device configured for communication in accordance with one or more communication standards promulgated by 3GPP, such as 3GPP's GSM, UMTS, LTE, and/or 5G standards. As mentioned previously, the term wireless device and UE may be used interchangeably. Accordingly, although FIG. 5 is a UE, the components discussed herein are equally applicable to a wireless device, and vice-versa.

In FIG. 5, the UE 500 includes processing circuitry 501 that is operatively coupled to an input/output interface 505, an RF interface 509, a network connection interface 511, memory 515 including RAM 517, ROM 519, and a storage medium 521 or the like, a communication subsystem 531, a power source 513, and/or any other component, or any combination thereof. The storage medium 521 includes an operating system 523, an application program 525, and data 527. In other embodiments, the storage medium 521 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, the processing circuitry 501 may be configured to process computer instructions and data. The processing circuitry 501 may be configured to implement any sequential state machine operative to execute machine instructions stored as machine-readable computer programs in memory, such as one or more hardware-implemented state machines (e.g., in discrete logic, FPGA, ASIC, etc.); programmable logic together with appropriate firmware; one or more stored programs, general purpose processors, such as a microprocessor or DSP, together with appropriate software; or any combination of the above. For example, the processing circuitry 501 may include two CPUs. Data may be information in a form suitable for use by a computer.

In the depicted embodiment, the input/output interface 505 may be configured to provide a communication interface to an input device, output device, or input and output device. The UE 500 may be configured to use an output device via the input/output interface 505. An output device may use the same type of interface port as an input device. For example, a USB port may be used to provide input to and output from the UE 500. The output device may be a speaker, a sound card, a video card, a display, a monitor, a printer, an actuator, an emitter, a smartcard, another output device, or any combination thereof. The UE 500 may be configured to use an input device via the input/output interface 505 to allow a user to capture information into the UE 500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, the RF interface 509 may be configured to provide a communication interface to RF components such as a transmitter, a receiver, and an antenna. The network connection interface 511 may be configured to provide a communication interface to a network 543A. The network 543A may encompass wired and/or wireless networks such as a LAN, a WAN, a computer network, a wireless network, a telecommunications network, another like network, or any combination thereof. For example, the network 543A may comprise a WiFi network. The network connection interface 511 may be configured to include a receiver and a transmitter interface used to communicate with one or more other devices over a communication network according to one or more communication protocols, such as Ethernet, Transmission Control Protocol (TCP)/IP, Synchronous Optical Networking (SONET), Asynchronous Transfer Mode (ATM), or the like. The network connection interface 511 may implement receiver and transmitter functionality appropriate to the communication network links (e.g., optical, electrical, and the like). The transmitter and receiver functions may share circuit components, software, or firmware, or alternatively may be implemented separately.

The RAM 517 may be configured to interface via a bus 502 to the processing circuitry 501 to provide storage or caching of data or computer instructions during the execution of software programs such as the operating system, application programs, and device drivers. The ROM 519 may be configured to provide computer instructions or data to the processing circuitry 501. For example, the ROM 519 may be configured to store invariant low-level system code or data for basic system functions such as basic Input and Output (I/O), startup, or reception of keystrokes from a keyboard that are stored in a non-volatile memory. The storage medium 521 may be configured to include memory such as RAM, ROM, Programmable ROM (PROM), Erasable PROM (EPROM), Electrically EPROM (EEPROM), magnetic disks, optical disks, floppy disks, hard disks, removable cartridges, or flash drives. In one example, the storage medium 521 may be configured to include the operating system 523, the application program 525 such as a web browser application, a widget or gadget engine, or another application, and the data 527. The storage medium 521 may store, for use by the UE 500, any of a variety of various operating systems or combinations of operating systems.

The storage medium 521 may be configured to include a number of physical drive units, such as a Redundant Array of Independent Disks (RAID), a floppy disk drive, flash memory, a USB flash drive, an external hard disk drive, a thumb drive, a pen drive, a key drive, a High-Density Digital Versatile Disc (HD-DVD) optical disc drive, an internal hard disk drive, a Blu-Ray optical disc drive, a Holographic Digital Data Storage (HDDS) optical disc drive, an external mini-Dual In-Line Memory Module (DIMM), Synchronous Dynamic RAM (SDRAM), external micro-DIMM SDRAM, smartcard memory such as a Subscriber Identity Module (SIM) or a Removable User Identity (RUIM) module, other memory, or any combination thereof. The storage medium 521 may allow the UE 500 to access computer-executable instructions, application programs, or the like, stored on transitory or non-transitory memory media, to off-load data or to upload data. An article of manufacture, such as one utilizing a communication system, may be tangibly embodied in the storage medium 521, which may comprise a device readable medium.

In FIG. 5, the processing circuitry 501 may be configured to communicate with a network 543B using the communication subsystem 531. The network 543A and the network 543B may be the same network or networks or different networks. The communication subsystem 531 may be configured to include one or more transceivers used to communicate with the network 543B. For example, the communication subsystem 531 may be configured to include one or more transceivers used to communicate with one or more remote transceivers of another device capable of wireless communication such as another wireless device, UE, or base station of a Radio Access Network (RAN) according to one or more communication protocols, such as IEEE 802.11, Code Division Multiple Access (CDMA), WCDMA, GSM, LTE, Universal Terrestrial RAN (UTRAN), WiMax, or the like. Each transceiver may include a transmitter 533 and/or a receiver 535 to implement transmitter or receiver functionality, respectively, appropriate to the RAN links (e.g., frequency allocations and the like). Further, the transmitter 533 and the receiver 535 of each transceiver may share circuit components, software, or firmware, or alternatively may be implemented separately.

In the illustrated embodiment, the communication functions of the communication subsystem 531 may include data communication, voice communication, multimedia communication, short-range communications such as Bluetooth, near-field communication, location-based communication such as the use of the Global Positioning System (GPS) to determine a location, another like communication function, or any combination thereof. For example, the communication subsystem 531 may include cellular communication, WiFi communication, Bluetooth communication, and GPS communication. The network 543B may encompass wired and/or wireless networks such as a LAN, a WAN, a computer network, a wireless network, a telecommunications network, another like network, or any combination thereof. For example, the network 543B may be a cellular network, a WiFi network, and/or a near-field network. A power source 513 may be configured to provide Alternating Current (AC) or Direct Current (DC) power to components of the UE 500.

The features, benefits, and/or functions described herein may be implemented in one of the components of the UE 500 or partitioned across multiple components of the UE 500. Further, the features, benefits, and/or functions described herein may be implemented in any combination of hardware, software, or firmware. In one example, the communication subsystem 531 may be configured to include any of the components described herein. Further, the processing circuitry 501 may be configured to communicate with any of such components over the bus 502. In another example, any of such components may be represented by program instructions stored in memory that, when executed by the processing circuitry 501, perform the corresponding functions described herein. In another example, the functionality of any of such components may be partitioned between the processing circuitry 501 and the communication subsystem 531. In another example, the non-computationally intensive functions of any of such components may be implemented in software or firmware and the computationally intensive functions may be implemented in hardware.

Figure 6:
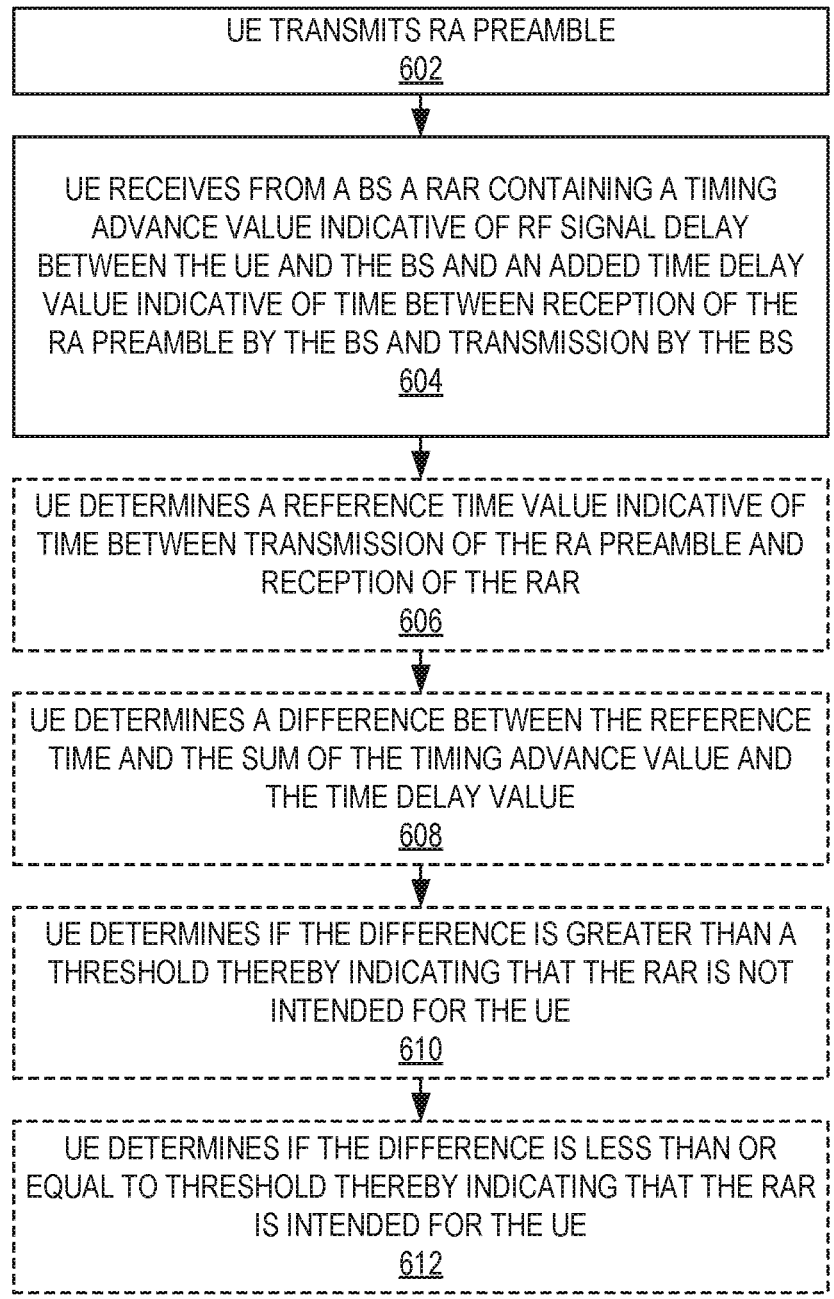
FIG. 6 illustrates a method performed in a UE in accordance with particular embodiments.

FIG. 6 depicts a method performed in a UE in accordance with particular embodiments. Optional steps are indicated with dashed lines. The method begins with the UE transmitting a RA preamble (step 602). The UE receives, from a BS, a RAR containing a timing advance value indicative of an RF signal delay between the UE and the BS and an added time delay value indicative of the time between reception of the RA preamble by the BS and transmission by the BS (step 604). While in step 604 the RAR includes the added time delay value, as described above, the RAR may more generally include information that is indicative of the added time delay (e.g., the added time delay value, a non-integer portion of the delay value, etc.). The UE determines a reference time value indicative of the time between transmission of the RA preamble and reception of the RAR (step 606). The UE determines a value $T_{ERR}$ that is an absolute value of the difference between the reference time and the sum of the timing advance value and the time delay value, as described above (step 608). The UE determines if $T_{ERR}$ is greater than a threshold thereby indicating that the RAR is not intended for the UE (step 610). The UE determines if $T_{ERR}$ is less than or equal to the threshold thereby indicating that the RAR is intended for the UE (step 612). Depending on whether the UE determines that RAR is intended for the UE or not, the UE proceeds accordingly (e.g., continues the RA procedure if the RAR is intended for the UE or, e.g., continues to monitor for a RAR if the RAR is not intended for the UE).

Figure 7:
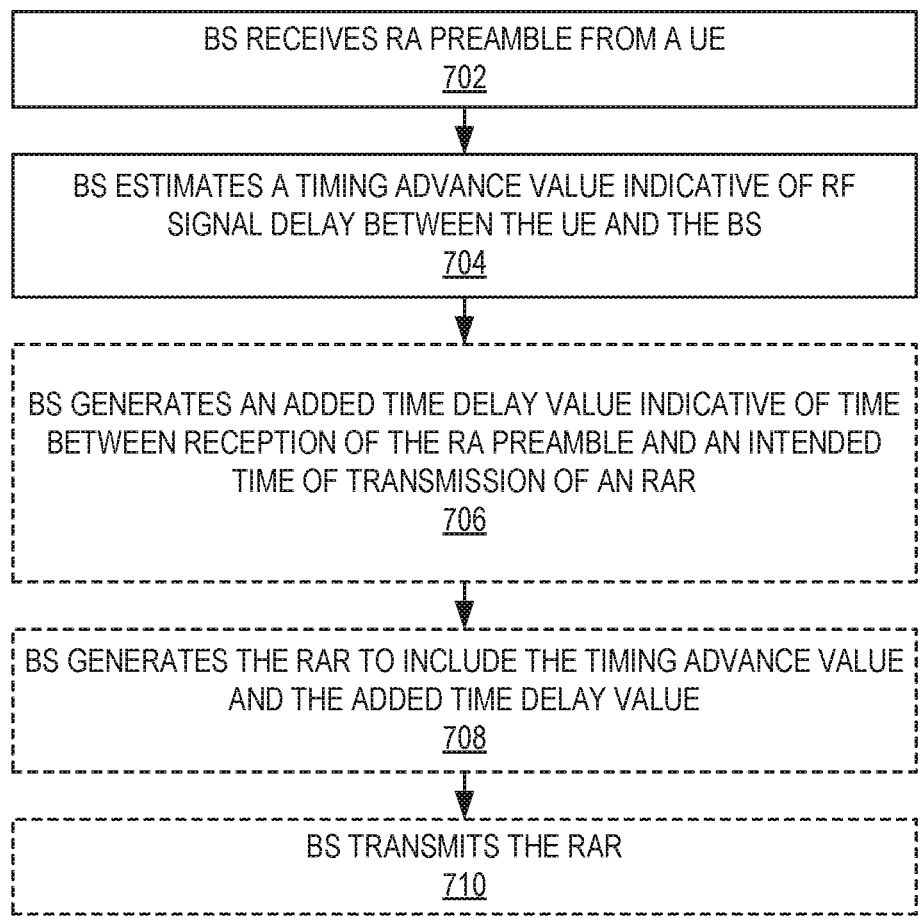
FIG. 7 illustrates a method performed in a BS in accordance with particular embodiments.

FIG. 7 depicts a method performed in a BS in accordance with particular embodiments. Optional steps are indicated with dashed lines. The method begins with the BS receiving a RA preamble from a UE (step 702). The BS estimates a timing advance value indicative of an RF signal delay between the UE and the BS (step 704). The BS generates an added time delay value indicative of the time between reception of the RA preamble and an intended time of transmission of a respective RAR (step 706). The BS generates the RAR to include the timing advance value and the added time delay value (step 708). The BS transmits the RAR (step 710).

Figure 8:
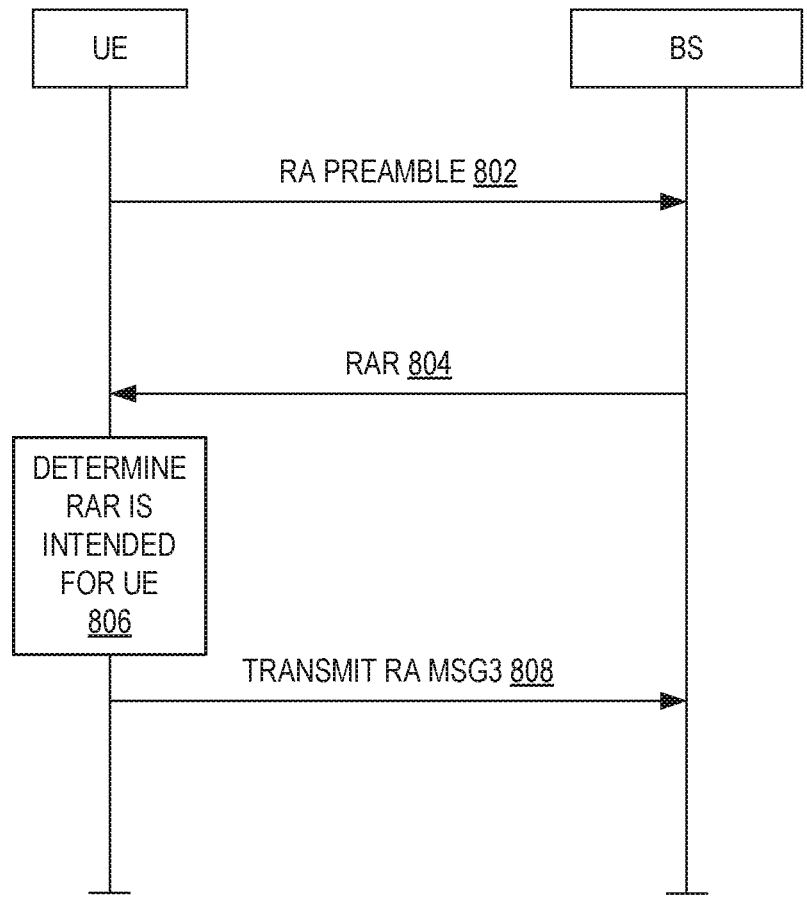
FIG. 8 is a signaling diagram illustrating a random access procedure between a UE and a BS according to particular embodiments.

FIG. 8 is a signaling diagram of a random access procedure between a UE and a BS according to disclosed embodiments. The method begins with the UE transmitting (step 802) a RA preamble. The BS transmits (step 804) a RAR As discussed above, the RAR includes information that indicates an added time delay value indicative of the time between reception of the RA preamble by the BS and transmission by the BS. In addition, as discussed above, the RAR includes a timing advance value indicative of an RF signal delay between the UE and the BS. The UE determines that the RAR is intended for the UE based on the added time delay value in accordance with any of the embodiments described above (step 806). Upon determining that the RAR is intended for the UE, the UE transmits (step 808) a RA MSG3 to the BS based on the $T_F$. As described herein, in some embodiments, the UE may transmit the RA MSG3 to the BS after determining that the RAR is intended for the UE, wherein the determining is based on the $T_F$, e.g. based on whether $T_A+T_F$ differs from $T_R$ by more than a threshold amount. As also described herein, in some embodiments, the BS may receive the RA MSG3 based on the $T_F$. As described herein, in some embodiments, the BS may receive the RA MSG3 based on the UE determining that the RAR is intended for the UE, which is further based on the $T_F$.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Group A Embodiments

Embodiment 1: A method implemented in a User Equipment, UE, for a cellular communication system, the method comprising: transmitting a Random Access, RA, preamble; and receiving a Random Access Response, RAR, from a base station, BS, containing a timing advance value, $T_A$, indicative of radio signal propagation delay between the UE and BS and an added time delay value, $T_F$, indicative of time between reception of the preamble by the BS and transmission of the RAR by the BS.

Embodiment 2: The method of embodiment 1 further comprising the step of determining a reference time value, $T_R$, indicative of time between transmitting the RAR preamble and receiving the RAR.

Embodiment 3: The method of embodiment 2 further comprising the step of determining a value, $T_{ERR}$, that is the absolute value of a difference between $T_R$ and the sum of $T_A$ and $T_F$.

Embodiment 4: The method of embodiment 3 further comprising the step of determining if $T_{ERR}$ is greater than a predetermined threshold, $T_{THRESHOLD}$, thereby indicating that the RAR is not intended for the UE.

Embodiment 5: The method of embodiment 3 further comprising the step of determining if $T_{ERR}$ is less than or equal to $T_{THRESHOLD}$ thereby indicating that the RAR is intended for the UE.

Embodiment 6: The method of any of the previous embodiments, further comprising: providing user data; and forwarding the user data to a host computer via the transmission to the base station.

Group B Embodiments

Embodiment 7: A method performed by a base station, BS, for a cellular communication system, the method comprising: receiving a Random Access, RA, preamble from a User Equipment, UE; estimating a timing advance value, $T_A$, indicative of radio signal propagation delay between the UE and BS; and generating an added time delay value, $T_F$, indicative of time between reception of the preamble by the BS and an intended transmission of a Random Access Response, RAR.

Embodiment 8: The method of embodiment 7, further comprising the step of generating the RAR to include $T_F$ and $T_A$.

Embodiment 9: The method of embodiment 8 further comprising the step of transmitting the RAR.

Embodiment 10: The method of any of the previous embodiments, further comprising: obtaining user data; and forwarding the user data to a host computer or a wireless device.

Group C Embodiments

Embodiment 11: A wireless device for the communication system, the wireless device comprising: processing circuitry configured to perform any of the steps of any of the Group A embodiments; and power supply circuitry configured to supply power to the wireless device.

Embodiment 12: A base station for the communication system, the base station comprising: processing circuitry configured to perform any of the steps of any of the Group B embodiments; power supply circuitry configured to supply power to the base station.

Embodiment 13: A User Equipment, UE, for the communication system, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
AP Access Point
ASIC Application Specific Integrated Circuit
BSC Base Station Controller
BTS Base Transceiver Station
CD Compact Disk
COTS Commercial Off-the-Shelf
CPE Customer Premise Equipment
CPU Central Processing Unit
D2D Device-to-Device
DAS Distributed Antenna System
DSP Digital Signal Processor
DVD Digital Video Disk
eNB Enhanced or Evolved Node B
E-SMLC Evolved Serving Mobile Location Center
FPGA Field Programmable Gate Array
GHz Gigahertz
gNB New Radio Base Station
GSM Global System for Mobile Communications
IoT Internet of Things
IP Internet Protocol
LEE Laptop Embedded Equipment
LME Laptop Mounted Equipment
LTE Long Term Evolution
M2M Machine-to-Machine
MANO Management and Orchestration
MCE Multi-Cell/Multicast Coordination Entity
MDT Minimization of Drive Tests
MIMO Multiple Input Multiple Output
MME Mobility Management Entity
MSC Mobile Switching Center
MSR Multi-Standard Radio
MTC Machine Type Communication
NB-IoT Narrowband Internet of Things
NFV Network Function Virtualization
NIC Network Interface Controller
NR New Radio
NRF Network Function Repository Function
O&M Operation and Maintenance
OSS Operations Support System
OTT Over-the-Top
PDA Personal Digital Assistant
P-GW Packet Data Network Gateway
RAM Random Access Memory
RAN Radio Access Network
RAT Radio Access Technology
RF Radio Frequency
RNC Radio Network Controller
ROM Read Only Memory
RRH Remote Radio Head
RRU Remote Radio Unit
SCEF Service Capability Exposure Function
SOC System on a Chip
SON Self-Organizing Network
UE User Equipment
USB Universal Serial Bus
V2I Vehicle-to-Infrastructure
V2V Vehicle-to-Vehicle
V2X Vehicle-to-Everything
VMM Virtual Machine Monitor
VNE Virtual Network Element
VNF Virtual Network Function
Vol P Voice over Internet Protocol
WCDMA Wideband Code Division Multiple Access
WiMax Worldwide Interoperability for Microwave Access Those skilled in the art will recognize improvements and modifications to the embodiments of the present disclosure. All such improvements and modifications are considered within the scope of the concepts disclosed herein.

What is claimed is:

1. A method implemented in a User Equipment, UE, for a cellular communication system, the method comprising:
    transmitting a Random Access, RA, preamble;
    receiving a Random Access Response, RAR, from a base station, BS, containing information indicative of an added time delay $T_F$ between reception of the RA preamble by the BS and transmission of the RAR by the BS, the information indicative of the $T_F$ between the reception of the RA preamble by the BS and the transmission of the RAR by the BS comprising a value that corresponds to the $T_F$, and the RAR further comprising a timing advance, $T_A$, value indicative of a radio signal propagation delay between the UE and the BS;
    determining a reference time, $T_R$, value indicative of a time between transmitting the RA preamble and receiving the RAR;
    determining a value, $T_{ERR}$, that is an absolute value of a difference between the $T_R$ value and a sum of the $T_A$ value and the $T_F$ value; and
    determining that the RAR is not intended for the UE in response to determining that the $T_{ERR}$ is greater than a predetermined threshold, $T_{THRESHOLD}$.

2. The method of claim 1, further comprising determining that the RAR is intended for the UE in response to determining the $T_{ERR}$ is less than or equal to the $T_{THRESHOLD}$.

3. The method of claim 1, wherein the information indicative of the $T_F$ between the reception of the RA preamble by the BS and the transmission of the RAR by the BS comprises information indicative of a number of at least one of units of time, transmission time intervals (TTIs), slots, and symbols.

4. The method of claim 1, wherein the information indicative of the $T_F$ between the reception of the RA preamble by the BS and the transmission of the RAR by the BS comprises a set of parameters needed by the UE to one of reconstruct, deduce, compute, and estimate the $T_F$.

5. The method of claim 1, wherein the information indicative of the $T_F$ is a combination of a number of TT's and a number of units of time.

6. The method of claim 1, further comprising transmitting a RA MSG3 to the BS based on the $T_F$.

7. A User Equipment, UE, for a cellular communication system, the UE configured to:
  transmit a Random Access, RA, preamble;
  receive a Random Access Response, RAR, from a base station, BS, containing information indicative of an added time delay, $T_F$, between reception of the RA preamble by the BS and transmission of the RAR by the BS, the information indicative of the $T_F$ between the reception of the RA preamble by the BS and the transmission of the RAR by the BS comprising a value that corresponds to the $T_F$, and the RAR further comprising a timing advance, $T_A$, value indicative of a radio signal propagation delay between the UE and the BS;
  determine a reference time, $T_R$, value indicative of a time between transmitting the RA preamble and receiving the RAR;
  determine a value, $T_{ERR}$, that is an absolute value of a difference between the $T_R$ value and a sum of the $T_A$ value and the $T_F$ value; and
  determine that the RAR is not intended for the UE in response to determining that the $T_{ERR}$ is greater than a predetermined threshold, $T_{THRESHOLD}$.

8. The UE of claim 7, further configured to determine that the RAR is intended for the UE in response to determining the $T_{ERR}$ is less than or equal to the $T_{THRESHOLD}$.

9. The UE of claim 7, further configured to transmit a RA MSG3 to the BS based on the $T_F$.

10. The UE of claim 7, wherein the UE comprises a radio interface and processing circuitry associated with the radio interface, the processing circuitry configured to cause the UE to:
  transmit the RA preamble; and
  receive the RAR from the BS.

\* \* \* \* \*